(12) United States Patent
Nakamura (10) Patent No.: US 10,527,833 B2
(45) Date of Patent: Jan. 7, 2020

(54) SURGICAL STEREOSCOPIC OBSERVATION APPARATUS

(71) Applicant: MITAKA KOHKI CO., LTD., Tokyo (JP)

(72) Inventor: Katsuyuki Nakamura, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 69 days.

(21) Appl. No.: 15/358,492

(22) Filed: Nov. 22, 2016

(65) Prior Publication Data

US 2017/0146780 A1     May 25, 2017

(30) Foreign Application Priority Data

Nov. 24, 2015 (JP) ................................ 2015-228401

(51) Int. Cl.
| | |
|---|---|
| G02B 21/00 | (2006.01) |
| H04N 13/239 | (2018.01) |
| G02B 21/02 | (2006.01) |
| G02B 21/22 | (2006.01) |
| G02B 21/24 | (2006.01) |
| G02B 21/36 | (2006.01) |

(52) U.S. Cl.
CPC ....... *G02B 21/0012* (2013.01); *G02B 21/025* (2013.01); *G02B 21/22* (2013.01); *G02B 21/241* (2013.01); *G02B 21/368* (2013.01); *H04N 13/239* (2018.05)

(58) Field of Classification Search
None
See application file for complete search history.

(56) References Cited

U.S. PATENT DOCUMENTS

| | | | | | |
|---|---|---|---|---|---|
| 4,447,717 | A | * | 5/1984 | Nohda | ................. G02B 21/245 250/201.4 |
| 4,783,159 | A | * | 11/1988 | Takagi | ................. G02B 21/082 359/377 |
| 5,052,789 | A | * | 10/1991 | Kleinberg | .............. G02B 21/18 359/375 |

(Continued)

FOREIGN PATENT DOCUMENTS

| | | |
|---|---|---|
| JP | H05-212056 | 8/1993 |
| JP | 11-318936 | 11/1999 |

(Continued)

OTHER PUBLICATIONS

Japanese Office Action in counterpart application No. JP2015-228401, dated May 8, 2019 (with English-language translation).

*Primary Examiner* — Derek S. Chapel
(74) *Attorney, Agent, or Firm* — Greenblum & Bernstein, P.L.C.

(57) ABSTRACT

A surgical stereoscopic observation apparatus includes an objective optical system having an optical axis and emits two focusing beams in parallel with the optical axis toward the objective optical system. If a focal point of the objective optical system agrees with a surgical field, the two focusing beams converge to a single spot on the surgical field, and if disagrees with the surgical field, form two spots on the surgical field. According to the state of the spots, it is possible to quickly determine with naked eye or on a monitor whether or not the focal point is on the surgical field.

9 Claims, 9 Drawing Sheets

(56) References Cited

U.S. PATENT DOCUMENTS

| | | | | |
|---|---|---|---|---|
| 5,865,829 | A * | 2/1999 | Kitajima | A61B 3/1241 359/351 |
| 6,238,385 | B1 * | 5/2001 | Harino | A61F 9/008 606/10 |
| 6,307,636 | B1 * | 10/2001 | Spink | G01B 11/026 356/614 |
| 6,661,571 | B1 * | 12/2003 | Shioda | A61B 1/04 359/368 |
| 7,307,785 | B2 * | 12/2007 | Obrebski | G02B 21/0012 359/388 |
| 8,958,147 | B2 * | 2/2015 | Tanner | G02B 21/06 359/385 |
| 10,063,850 | B2 * | 8/2018 | Nakamura | A61B 1/00 |
| 10,122,991 | B2 * | 11/2018 | Nakamura | G02B 21/361 |
| 2002/0109912 | A1 * | 8/2002 | Knoblich | G02B 21/082 359/385 |
| 2003/0223109 | A1 * | 12/2003 | Deverin | G02B 21/0012 359/389 |
| 2004/0090667 | A1 | 5/2004 | Gartner et al. | |
| 2005/0020876 | A1 * | 1/2005 | Shioda | A61B 1/00039 600/101 |
| 2005/0231799 | A1 * | 10/2005 | Kawasaki | G02B 21/06 359/385 |
| 2006/0232855 | A1 * | 10/2006 | Nakamura | G01N 21/6458 359/385 |
| 2013/0201552 | A1 * | 8/2013 | Sander | G02B 21/0076 359/385 |
| 2016/0381347 | A1 * | 12/2016 | Nakamura | A61B 1/00 348/49 |
| 2017/0048512 | A1 * | 2/2017 | Nakamura | H04N 13/0253 |

FOREIGN PATENT DOCUMENTS

| | | |
|---|---|---|
| JP | 2005-161086 | 6/2005 |
| JP | 2010-207460 | 9/2010 |

* cited by examiner

SURGICAL STEREOSCOPIC OBSERVATION APPARATUS

BACKGROUND OF THE INVENTION

1. Field of the Invention

The present invention relates to a surgical stereoscopic observation apparatus.

2. Description of Related Art

When a doctor of, for example, neurosurgery conducts surgery on a surgical field of a patient, the doctor may use a surgical microscope to observe an enlarged view of the surgical field. The doctor puts his or her eyes on eyepieces of the microscope and observes an enlarged image of the surgical field through an optical system of the microscope.

Observing the enlarged image of a surgical field with the surgical microscope forces the doctor to always put his or her eyes on the eyepieces of the microscope. If slanting the microscope for better observation of the surgical field, the doctor must incline his or her neck. Namely, the surgical microscope frequently requires the doctor to take an unreasonable posture during surgery.

To deal with this problem, a surgical stereoscopic apparatus for replacing the surgical microscope has been proposed. This apparatus employs a lens barrel incorporating a camera that photographs a surgical field of a patient and provides stereoscopic electronic images of the surgical field. The images are displayed on a monitor and are stereoscopically observed with 3D glasses.

The lens barrel is suspended from and movably supported with a stand. A doctor may hold the lens barrel and optionally changes the position and orientation thereof, thereby choosing an optimum observation direction.

This apparatus does not require the doctor to put his or her eyes on eyepieces, and therefore, the doctor is able to carry out surgery in an optional posture. Not only the doctor but also assistants are able to observe the surgical field on the monitor. Related arts are disclosed in, for example, Japanese Unexamined Patent Application Publication No. H11-318936 (Patent Literature 1).

SUMMARY OF THE INVENTION

Unlike the surgical microscope, the surgical stereoscopic apparatus mentioned above does not require doctor s eyes to be put on eyepieces. The doctor, therefore, is able to move the lens barrel of the apparatus more widely than the surgical microscope. Once the lens barrel is moved, a focal point thereof must be adjusted to a surgical field. If the focal point disagrees with the surgical field, the doctor must adjust the focal point on the monitor. This focal adjustment is troublesome for the doctor because the doctor must confirm on the monitor whether or not the lens barrel is focused on the surgical field.

To solve the problems of the related arts, the present invention provides a surgical stereoscopic observation apparatus that realizes easy focusing whenever a lens barrel of the arrangement is moved.

According to a first aspect of the present invention, the surgical stereoscopic observation apparatus includes a lens barrel that contains an optical unit to provide stereoscopic optical images of a surgical field and an imaging unit to pick up the stereoscopic optical images provided by the optical unit and output a stereoscopic image signal, a stand to support the lens barrel and move the same to an optional position, and a panel monitor to display stereoscopic images according to the stereoscopic image signal provided by the imaging unit. The optical unit at least includes a single objective optical system and variable power optical systems, a pair of left and right beams passing through the variable power optical systems in parallel with an optical axis of the objective optical system and guided directly or after reflection into the variable power optical systems. The lens barrel includes a beam emitting unit to emit two focusing beams in parallel with the optical axis of the objective optical system toward the objective optical system. The two focusing beams converge to a focal position of the objective optical system.

According to a second aspect of the present invention, the focusing beams enter the objective optical system at locations that are different from locations where the beams for the variable power optical systems exit from the objective optical system.

According to a third aspect of the present invention, movable parts of the stand supporting the lens barrel are provided with electromagnetic clutches to lock and unlock the movable parts, the magnetic clutches being unlocked when a releasing switch is operated, so that the stand is put in a movable state and the lens barrel becomes movable to an optional position and orientation. When the releasing switch is operated, the beam emitting unit emits the focusing beams.

According to a fourth aspect of the present invention, a focal length of the objective optical system is variable by operating a focusing switch and the beam emitting unit emits the focusing beams when the focusing switch is operated.

DESCRIPTION OF PREFERRED EMBODIMENTS

Figure 1:
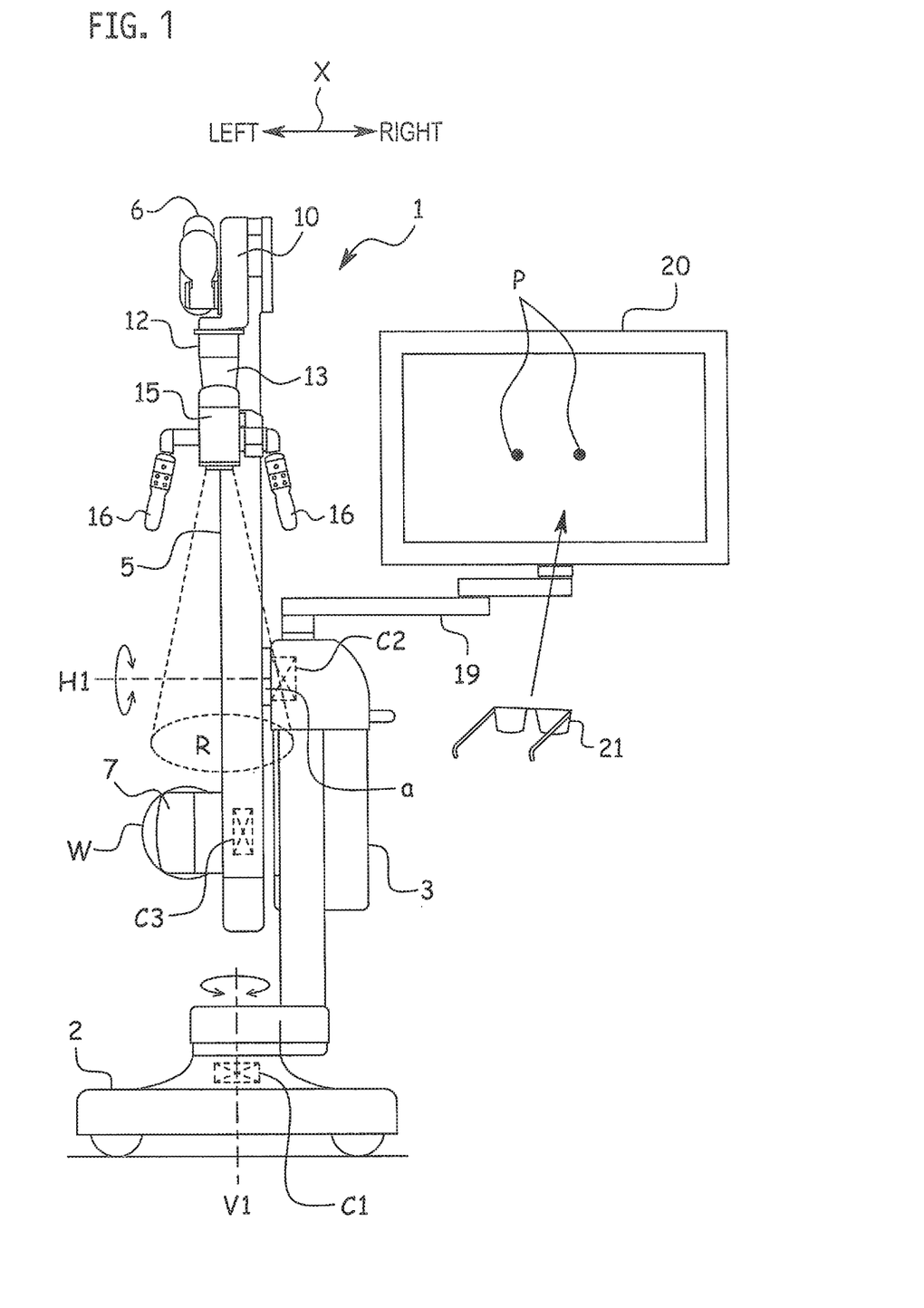
FIG. 1 is a front view illustrating a surgical stereoscopic observation apparatus according to an embodiment of the present invention.

A surgical stereoscopic observation apparatus according to an embodiment of the present invention will be explained with reference to FIGS. 1 to 9. In the following explanation, a direction X in FIG. 1 is referred to as a left-right or horizontal direction and a direction Y in FIG. 2 as a forward-backward direction.

Figure 2:
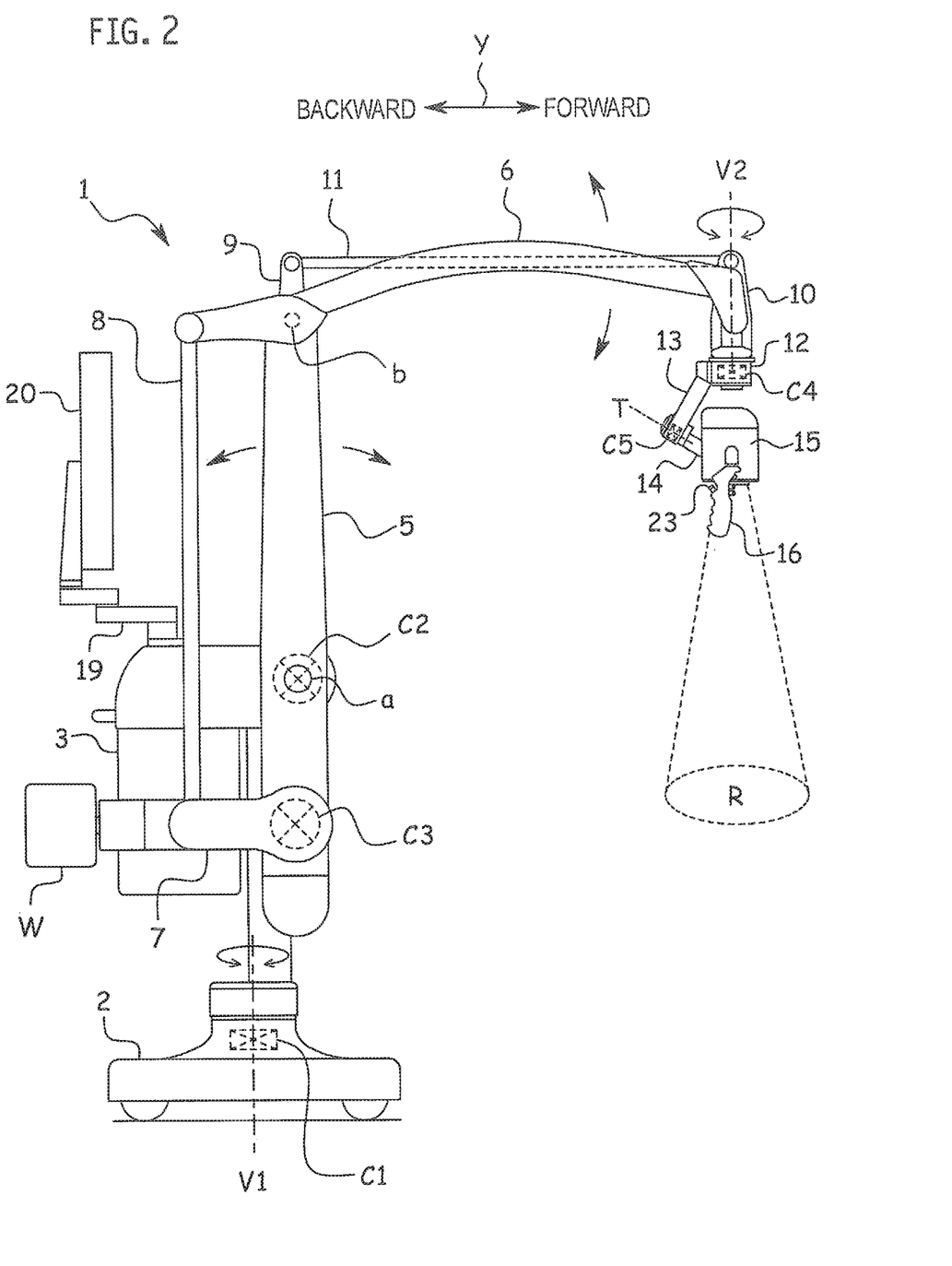
FIG. 2 is a side view illustrating the surgical stereoscopic observation apparatus.
Figure 3:
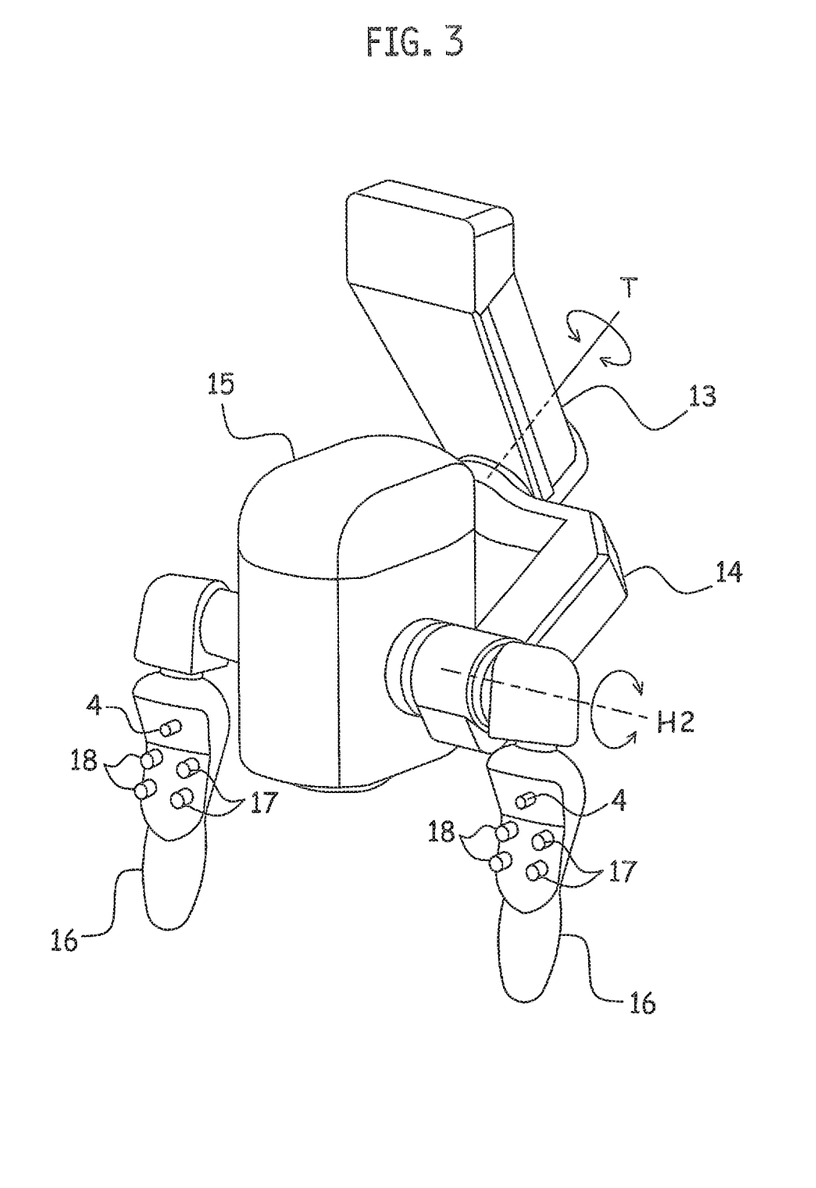
FIG. 3 is a perspective view illustrating a lens barrel of the surgical stereoscopic observation apparatus.
Figure 4:
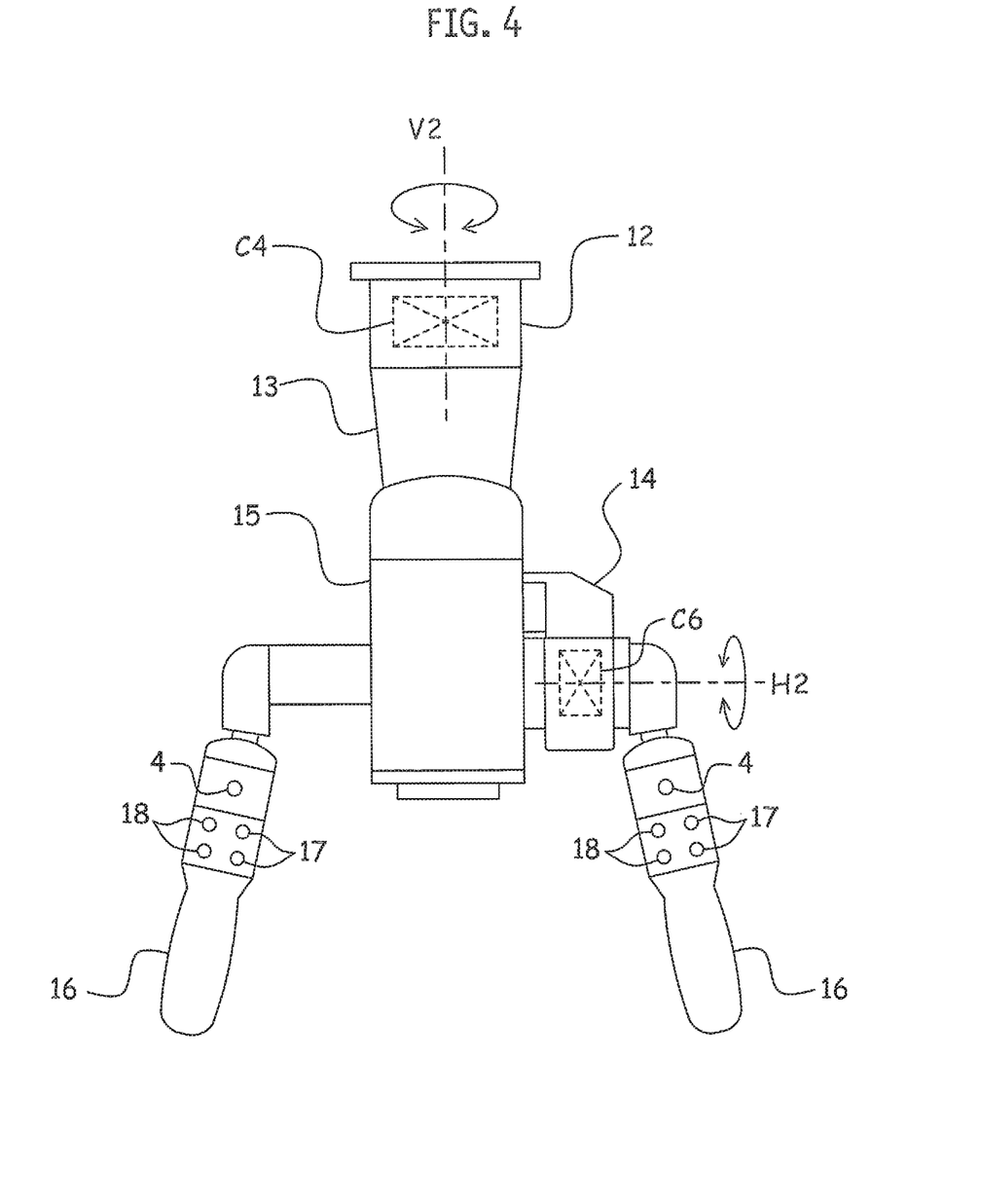
FIG. 4 is a front view illustrating the lens barrel.
Figure 5:
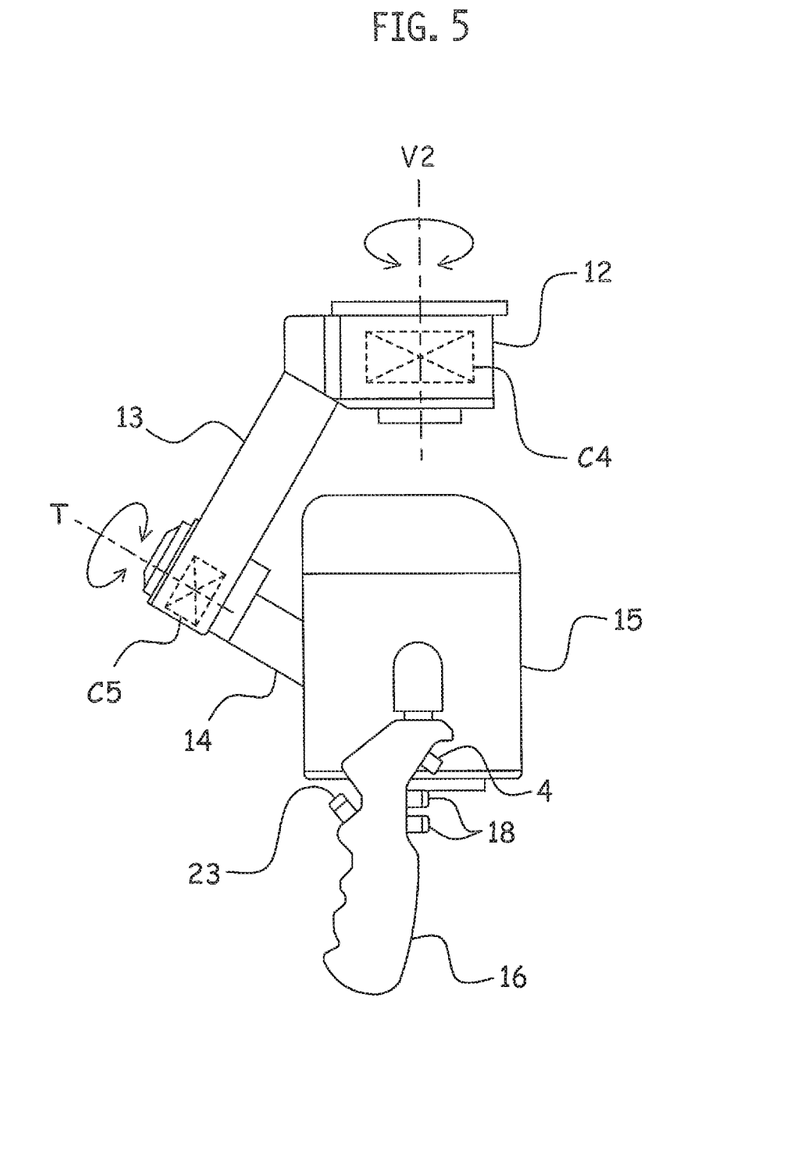
FIG. 5 is a side view illustrating the lens barrel.

The surgical stereoscopic observation apparatus includes a stand 1 that is set in an operating room. The stand 1 includes a base 2 and a stand body 3.

The stand body 3 is installed on the base 2 and is turnable around a vertical axis V1. The base 2 has an electromagnetic clutch C1 to lock a turn of the stand body 3. The stand body 3 has on a left side face thereof a fulcrum "a" defining a rotational axis of a vertical arm 5 to support an intermediate part thereof. The vertical arm 5 is tiltable in the forward-backward direction around a horizontal axis H1 that passes through the fulcrum a. The fulcrum a is provided with an electromagnetic clutch C2 to lock a tilt of the vertical arm. 5.

The vertical arm 5 has at an upper end thereof a fulcrum "b" to support a horizontal arm 6 so that the horizontal arm 6 may turn in an up-down direction. The horizontal arm 6 is made of a metal pipe that is curved and horizontally extended. A lower part of the vertical arm 5 is provided with a bottom arm 7 that extends in a backward direction. An end of the bottom arm 7 is provided with a counterweight W. An end of the horizontal arm 6 is connected through a vertical sub-arm 8 to an intermediate part of the bottom arm 7, thereby forming a vertical parallel linkage including the vertical arm 5 and vertical sub-arm 8. The vertical arm 5 and bottom arm 7 are connected to each other through a connection shaft where an electromagnetic clutch C3 is arranged to lock a turn of the horizontal arm 6.

The fulcrum b at the upper end of the vertical arm 5 defines a rotational axis of a base end arm 9 to support a lower end thereof. A front end of the horizontal arm 6 supports an intermediate part of a front end arm 10. An upper end of the base end arm 9 is connected through a straight horizontal sub-arm 11 to an upper end of the front end arm 10, thereby forming a horizontal parallel linkage including the horizontal arm 6 and horizontal sub-arm 11. The base end arm 9 is always maintained in a vertical state with an inner structure of the vertical arm 5.

A lower part of the front end arm 10 is provided with a box 12 that is turnable around a vertical axis V2. The box 12 is connected to two auxiliary arms 13 and 14 to support a lens barrel 15. The box 12 has an electromagnetic clutch C4 to lock a turn of the box 12.

An upper end of the auxiliary arm 13 is fixed to the box 12. A lower end of the auxiliary arm 13 supports the auxiliary arm 14 that has an L-shape and is turnable around an oblique axis T. A lower end of the L-shaped auxiliary arm 14 supports the lens barrel 15 so that the lens barrel 15 may turn around a horizontal axis H2. The oblique axis T is provided with an electromagnetic clutch C5 to lock a turn of the L-shaped auxiliary arm 14 around the oblique axis T. The horizontal axis H2 is provided with an electromagnetic clutch C6 to lock a turn of the lens barrel 15 around the horizontal axis H2. The electromagnetic clutches C5 and C6 of the oblique and horizontal axes T and H2 are set on motors (not illustrated) so that structures in front of the electromagnetic clutches C5 and C6 are turnable under a locked state.

The vertical axis V2, oblique axis T, and horizontal axis H2 cross one another at a point that substantially agrees with a gravity center of the lens barrel 15. These three axes correspond to three rotary shafts that support the lens barrel 15 in a manner of a gimbal mechanism. At a given position, the lens barrel 15 is properly oriented by controlling handles 16 arranged on the left and right sides of the lens barrel 15, so that a surgical field R is photographed from an optimum height and direction.

Figure 6:
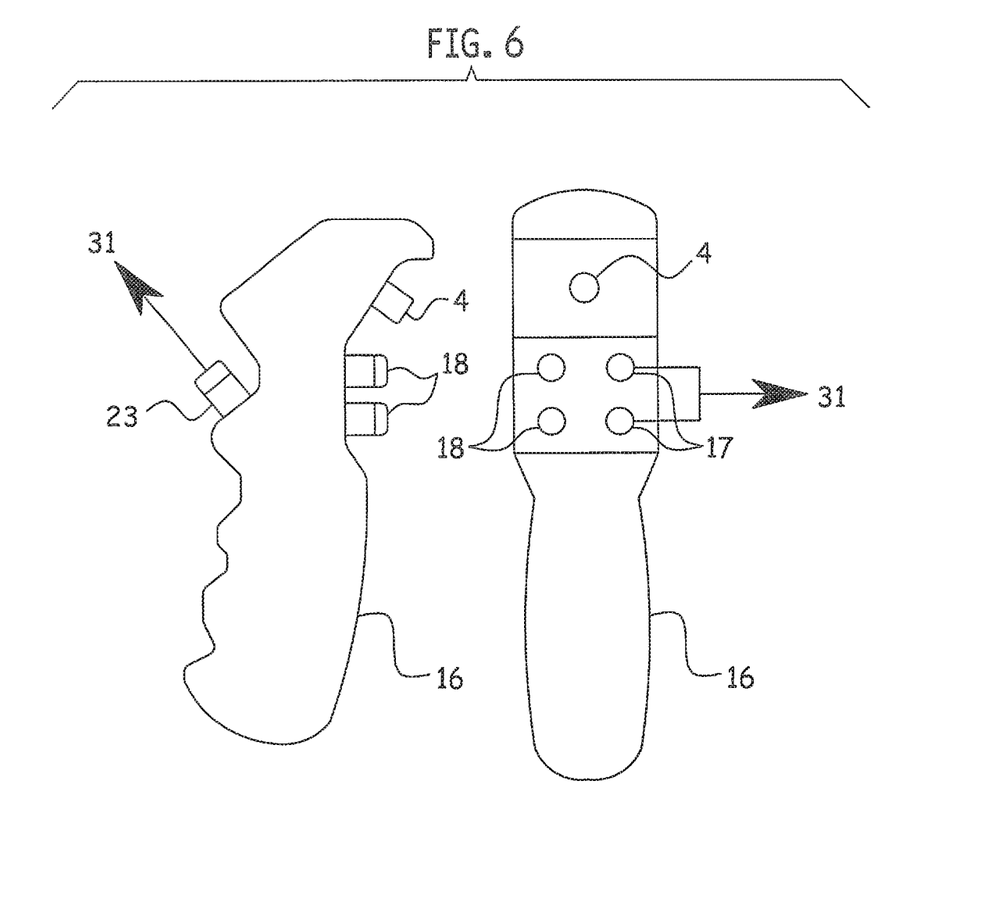
FIG. 6 is side and front views illustrating a handle of the lens barrel.

Each of the handles 16 has on the surface thereof focusing switches 17, zooming switches 18, and a joystick 4, and on the back thereof, a releasing switch 23.

A pair of the upper and lower focusing switches 17 are used to change a focal length of an objective optical system 22 to be explained later. A pair of the upper and lower zooming switches 18 are used to change the power of variable power optical systems 26 to be explained later. The releasing switch 23 is used to release the electromagnetic clutches C1 to C6 from their respective locked states.

The electromagnetic clutches C1 to C6 are always locked and are unlocked while the releasing switch 23 is being pressed. When the joystick 4 is tilted in the left-right direction, the motor (not illustrated) arranged for the oblique axis T rotates in the tilted direction. When the joystick 4 is tilted in the up-down direction, the motor (not illustrated) arranged for the horizontal axis H2 rotates in the tilted direction. The joystick 4 is used to slightly move a view field of the surgical field R in the left-right or up-down direction.

An upper part of the stand body 3 supports a folding arm 19 whose front end supports a panel monitor 20. The monitor 20 displays stereoscopic images of the surgical field R photographed by the lens barrel 15. A surgeon or an assistant employs 3D glasses 21 to stereoscopically observe the images displayed on the monitor 20.

Figure 7:
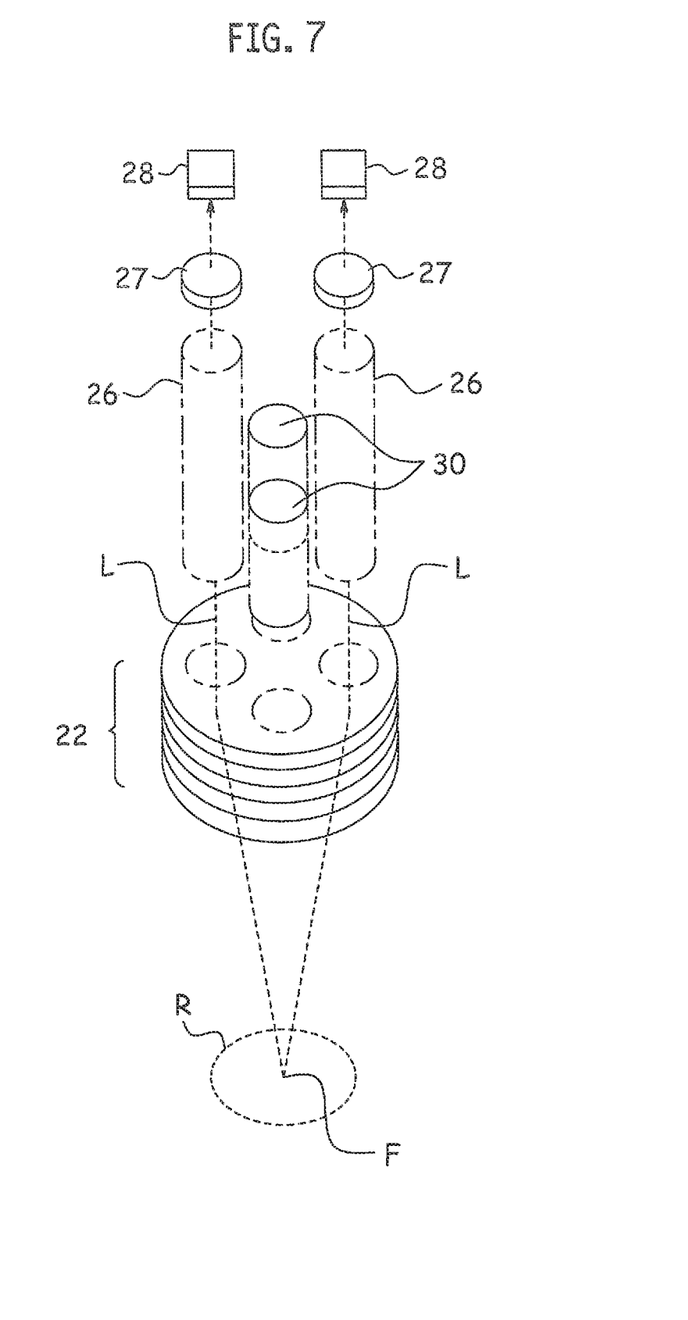
FIG. 7 is a perspective view illustrating an internal structure of the lens barrel.
Figure 8:
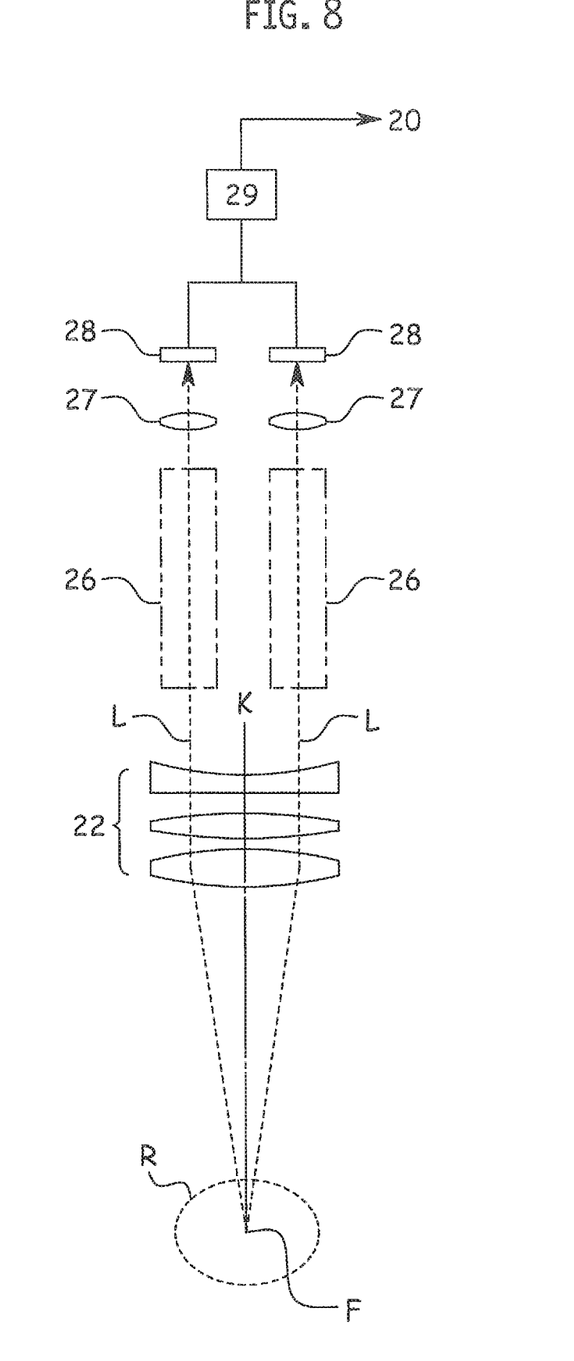
FIG. 8 is a front view illustrating the internal structure of the lens barrel.
Figure 9:
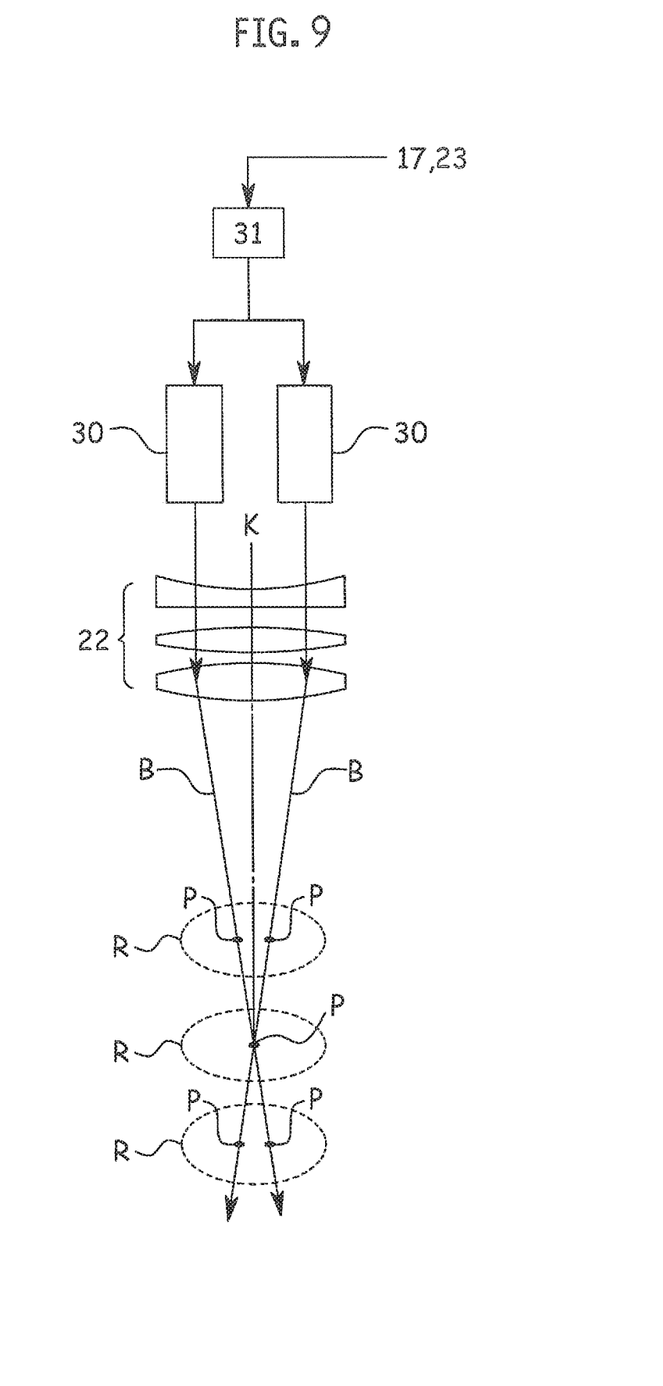
FIG. 9 is a side view illustrating the internal structure of the lens barrel.

An internal structure of the lens barrel 15 will be explained.

The lens barrel 15 is configured to conduct stereoscopic photographing and internally defines left and right light paths L. Arranged at lower part of the lens barrel 15 is the objective optical system 22 including three lenses. The objective optical system 22 has an optical axis K on which the surgical field R to be observed is present. Some of the lenses of the objective optical system 22 are movable to vary a focal length of the objective optical system 22 in the range of 300 mm to 1000 mm.

Arranged above the objective optical system 22 and on the optical paths L that are in parallel with the optical axis K are a pair of the left and right variable power optical systems 26. The variable power optical systems 26 are able to realize enlargement up to 40 times. The variable power optical systems 26 must be arranged on the optical paths t that pass through the objective optical system 22. However, they are not always required to be in parallel with the optical axis K of the objective optical system 22. For example, they may be horizontally arranged by changing the direction of the optical paths L with the use of, for example, mirrors. The optical paths L pass through imaging lenses 27 and reach imaging elements 28. The imaging elements 28 are typically CCD area image sensors. These optical devices are arranged on the optical paths L in order of the objective optical system 22, variable power optical systems 26, imaging lenses 27, and imaging elements 28. According to the embodiment, the objective optical system 22, variable power optical systems 26, and imaging lenses 27 correspond to the "optical unit" stipulated in the claims and the imaging elements 28 to the "imaging unit" stipulated in the claims.

The surgical field R is illuminated with illuminating light emitted from an illuminating unit (not illustrated) installed in the lens barrel 15. Reflected light from the surgical field R enters the objective optical system 22. In the objective optical system 22, the reflected light, advances along the optical paths L, travels through the variable power optical systems 26, and is received by the imaging elements 28 that provide images having binocular parallax for left and right eyes. The left and right images having binocular parallax are synthesized into stereoscopic image signals by a controller 29 and displayed on the monitor 20. The images displayed on the monitor 20 are viewed through the 3D glasses 21 and the surgical field R is stereoscopically observed.

The lens barrel 15 incorporates a pair of beam emitters 30 for emitting focusing beams B above the objective optical system 22. The beam emitters 30 are aligned in a direction that is orthogonal to a direction in which the variable power optical systems 26 through which the optical paths L pass are aligned. Since the beam emitters 30 are arranged at positions different from positions where the variable power optical systems 26 are arranged on the optical paths L, the beam emitters 30 never interfere with the variable power optical systems 26. Optical paths of the focusing beams B emitted from the beam emitters 30 and the optical paths L on which the variable power optical systems 26 pass through the objective optical system 22 in parallel with the optical axis K and never interfere with each other in the objective optical system 22.

The beam emitters 30 are small semiconductor laser emitters and emit laser beams as the focusing beano B in parallel with the optical axis K. The focusing beams B travel through the objective optical system 22 and converge to a point at a focal length of the objective optical system 22. Even if the focal length of the objective optical system 22 is changed, the focusing beams B still converge at a focal point F of the objective optical system 22. Namely, the two optical paths of the focusing beams B cross each other at the focal point F at a predetermined angle. Accordingly, the optical paths L and the optical paths defined by the focusing beams B are both in parallel with the optical axis K and pass through the single objective optical system 22 and focal point F. The beam emitters 30 are interlocked through a controller 31 with the releasing switches 23 and focusing switches 17 on the handles 16. While these switches are being pressed, the beam emitters 30 continue to emit the focusing beams B.

Operation of the surgical stereoscopic observation apparatus according to the embodiment will be explained.

To photograph the surgical field R and display images thereof on the monitor 20, a surgeon grasps the handles 16 and pushes the releasing switch 23 to release the electromagnetic clutches C1 to C6 from locked states. While the releasing switch 23 is being pressed, the electromagnetic clutches C1 to C6 are unlocked and the movable parts such as the fulcrum a of the stand 1 are able to turn. The surgeon, therefore, is able to move the lens barrel 15 to a required position.

While the releasing switch 23 is being pushed, the bears emitters 30 continue to emit the focusing beams B. When the surgeon moves the lens barrel 15 over the surgical field R, the focusing beams B form spots P on the surgical field R. The spots P are visible with naked eye or observable on the monitor 20.

As illustrated in FIG. 9, the spots P overlap to form a single point if the focal point F of the objective optical system 22 is correctly on the surgical field R. If the focal point F disagrees with the surgical field R, the spots P are visible as two points. In this case, the distance between the spots P indicates a deviation e focal point F from the surgical field R. As, the distance increases the deviation increases, and as the distance decreases the deviation decreases.

Slightly moving the lens barrel 15 in the up-down direction will tell whether the focal point F of the objective optical system 22 in the lens barrel 15 is on that (lower) side or on this (upper) side of the surgical field R. Namely, if the distance between the spots P of the focusing beams B becomes smaller when the lens barrel 15 is lowered, the focal point F of the objective optical system 22 is on this side (upper side) of the surgical field R. If the distance becomes larger when the lens barrel 15 is lowered, the focal point F is on that side (lower side) of the surgical field R. According to the number of and the distance between the spots P appearing on the surgical field the surgeon is able to quickly grasp the state of the focal point F of the lens barrel 15 and adjust the focal point F to the surgical field R. Once the focal point F is adjusted to the surgical field R, the surgeon releases the releasing switch 23 to stop the emission of the focusing beams B and lock the electromagnetic clutches C1 to C6. The surgeon then starts to stereoscopically observe the surgical field R on the monitor 20.

During the observation, the surgeon may change the focal distance of the lens barrel 15. For this, the surgeon presses the focusing switch 17. At this time, the beam emitters 30 emit the focusing beams B so that the surgeon can adjust the focal point EP of the lens barrel 15 according to the state of the spots P of the focusing beams B on the surgical field R. In this way, the surgeon is able to instantaneously adjust the focal point F of the lens barrel 15 to the surgical field R, and therefore, is able to move the lens barrel 15 to a required position with a sense of security.

The embodiment needs no exclusive switches for emitting the focusing beams B from the beam emitters 30 because the beam emitters 30 automatically emit the focusing beams B when the releasing switch 23 or focusing switch 17 is pushed.

Although the embodiment employs the two beam emitters 30 to emit the focusing beams B it is possible to employ a single beam emitter to emit a single focusing beam and split the beam into two focusing beams.

It is not always necessary to arrange the beam emitters 30 just above or within the range of the objective optical system 22. The beam emitters 30 may be arranged out of the range of the objective optical system 22. In this case, beams from the beam emitters 30 are reflected by, for example, mirrors and are guided to an incident surface of the objective optical system 22 to form the focusing beams B that are in parallel with the optical axis K of the objective optical system 22.

Although the embodiment unlocks all of the electromagnetic clutches C1 to C6 when the releasing switch 23 is pressed, it is possible to arrange a second releasing switch to unlock some of the clutches and emit the focusing beams B.

Although the embodiment employs the 3D glasses 21 to stereoscopically observe images displayed on the monitor 20, it is possible to employ a monitor capable of displaying images that are stereoscopically viewable with naked eye.

According to the first aspect of the present invention, the surgical stereoscopic observation apparatus emits the two focusing beams in parallel with the optical axis of the objective optical system. When the focal point of the objective optical system agrees with a surgical field, the two focusing beans converge to a single spot on the surgical field. If the focal point disagrees with the surgical field, the focusing beams form two spots on the surgical field. According to the state of the spots it is possible to speedily determine with naked eye or on a monitor whether or not the focal point is correctly on the surgical field. According to the state of the two spots, one may move the lens barrel that contains the objective optical system in the up-down direction to easily focus the lens barrel to the surgical field.

According to the second aspect of the present invention, the focusing beams enter the objective optical system at locations that are different from locations where beams for the variable power optical systems exit from the objective optical system. This configuration prevents the focusing beams from interfering with the beams for the variable power optical systems, thereby securing the focusing beams.

According to the third aspect of the present invention, the focusing beams are automatically emitted when the releasing switch is pushed to unlock the electromagnetic clutches and make the lens barrel movable. This configuration eliminates the need of a separate switch for emitting the focusing beams and is able to emit the focusing beams whenever the beams are needed to confirm a focusing state.

According to the fourth aspect of the present invention, the focusing beams are automatically emitted when the focusing switch is pushed to change a focal length of the objective optical system. This configuration eliminates the need of a separate switch for emitting the focusing beams and is able to emit the focusing beams whenever the beams are needed to confirm a focusing state.

This patent application claims the benefit of priority under 35 U.S.C. 119 (a) Japanese Patent Application No 2015-228401 filed on Nov. 24, 2015 whose disclosed contents are cited herein.

What is claimed is:

1. A surgical stereoscopic observation apparatus, comprising:
    a lens barrel including an optical unit for providing stereoscopic optical images of a surgical field and an imaging sensor for picking up the stereoscopic optical images provided by use of the optical unit and outputting a stereoscopic image signal,
    a stand supporting the lens barrel and moving the lens barrel to a selectable position, and
    a panel monitor displaying stereoscopic images according to the stereoscopic image signal provided by the imaging sensor, wherein:
    the optical unit at least includes a single objective optical system and a pair of variable power optical systems, a pair of left and right beams respectively passing through the pair of variable power optical systems in parallel with an optical axis of the objective optical system and guided directly or after reflection into the variable power optical systems;
    the lens barrel includes a pair of beam emitters for emitting two focusing beams in parallel with the optical axis of the objective optical system toward the objective optical system;
    the pair of beam emitters are aligned with each other in a direction that is orthogonal to a direction in which the pair of variable power optical systems are aligned with each other, such that each of the pair of beam emitters is offset ninety degrees from each of the pair of variable power optical systems in a circumferential direction of the lens barrel;
    the pair of beam emitters and the pair of variable power optical systems overlap each other in a longitudinal direction of the lens barrel; and
    the two focusing beams converge to a focal position of the objective optical system.

2. The surgical stereoscopic observation apparatus of claim 1, wherein the focusing beams and the beams for the variable power optical systems define different optical paths in the objective optical system in order not to interfere with each other.

3. The surgical stereoscopic observation apparatus of claim 1, wherein:
    movable parts of the stand supporting the lens barrel are provided with electromagnetic clutches to lock and unlock the movable parts, the magnetic clutches being unlocked when a releasing switch is operated, so that the stand is put in a movable state and the lens barrel becomes movable to a selectable position and orientation; and
    the beam emitters emit the focusing beams when the releasing switch is operated.

4. The surgical stereoscopic observation apparatus of claim 1, wherein a focal length of the objective optical system is variable by operating a focusing switch and the beam emitters emit the focusing beams when the focusing switch is operated.

5. The surgical stereoscopic observation apparatus of claim 1, further comprising:
    a releasing switch for unlocking electromagnetic clutches to unlock movable parts; and
    a focusing switch for varying a focal length of the objective optical system,
    wherein the beam emitters are interlocked with the releasing switch and the focusing switch, and
    wherein while either of the releasing switch and the focusing switch is being depressed, the beam emitters continue to emit the focusing beams.

6. The surgical stereoscopic observation apparatus of claim 1, further comprising:
    at least one handle;
    a releasing switch for unlocking electromagnetic clutches to unlock movable parts, the releasing switch arranged on the at least one handle;
    a focusing switch for varying a focal length of the objective optical system, the focusing switch arranged on the at least one handle; and
    a controller,
    wherein the beam emitters are interlocked through the controller with the releasing switch and the focusing switch, and
    wherein while either of the releasing switch and the focusing switch is being depressed, the beam emitters continue to emit the focusing beams.

7. The surgical stereoscopic observation apparatus of claim 1, wherein the beam emitters comprise two beam emitters for emitting the two focusing beams, respectively.

8. The surgical stereoscopic observation apparatus of claim 1, wherein the emitting the beams comprises discharging a respective beam directly from an end of each of the beam emitters.

9. The surgical stereoscopic observation apparatus of claim 1, wherein the beam emitters comprise semiconductor laser emitters that emit laser beams as the focusing beams.

* * * * *